United States Patent [19]

Pendleton

[11] 4,038,359

[45] July 26, 1977

[54] METHOD OF MAKING A SHAFT SEAL WITH DUAL LIP

[75] Inventor: Darrell D. Pendleton, Gastonia, N.C.

[73] Assignee: Garlock Inc., Rochester, N.Y.

[21] Appl. No.: 544,303

[22] Filed: Jan. 27, 1975

[51] Int. Cl.$^2$ .......................... B29D 3/00; B29H 3/00
[52] U.S. Cl. .................................... 264/263; 156/245;
 264/265; 264/268; 264/269; 264/273; 264/274
[58] Field of Search ............... 264/261, 263, 268, 269,
 264/273, 265, 249, 267; 277/134, 181, 182, 183,
 37, 47, 178, 184, 134, 180, 152

[56] References Cited

U.S. PATENT DOCUMENTS

| | | | |
|---|---|---|---|
| 2,717,793 | 9/1955 | Nenzell | 277/180 |
| 2,804,324 | 8/1957 | Stallings | 277/153 |
| 2,804,325 | 8/1957 | Riesing | 277/182 |
| 2,955,481 | 10/1960 | Jackel | 264/273 |
| 3,194,570 | 7/1965 | Haynie et al. | 277/182 |
| 3,241,845 | 3/1966 | Smith et al. | 277/182 |
| 3,306,622 | 2/1967 | Liebig | 277/47 |
| 3,462,333 | 8/1969 | McCormick | 277/182 |
| 3,549,445 | 12/1970 | McMahon | 277/184 |
| 3,658,395 | 4/1972 | Hallerback | 277/183 |
| 3,929,341 | 12/1975 | Clark | 277/134 |

FOREIGN PATENT DOCUMENTS 1,144,772  3/1969  United Kingdom ................. 277/182

OTHER PUBLICATIONS

Mayer et al., "Phosphate Coatings", Metal Finishing Guidebook & Directory, Metals & Plastics Pub. Inc., Westwood, N.J. (1972), pp. 590 and 592–594.

Primary Examiner—Willard E. Hoag
Attorney, Agent, or Firm—Schovee & Boston

[57] ABSTRACT

A shaft seal of the type including a metal case and a polytetrafluoroethylene sealing element, is provided with an auxiliary sealing lip by providing a radial flange of the metal case with a plurality of circumferentially spaced-apart apertures therethrough and molding an annular filler ring of synthetic rubber in the space between the sealing element and the metal case such that the rubber also flows through the apertures to the other side of the radial flange of the metal case and forms an auxiliary lip there. The filler ring chemically bonds to the metal case and mechanically bonds to the sealing element to lock the sealing element in place while also forming an auxiliary lip.

9 Claims, 1 Drawing Figure

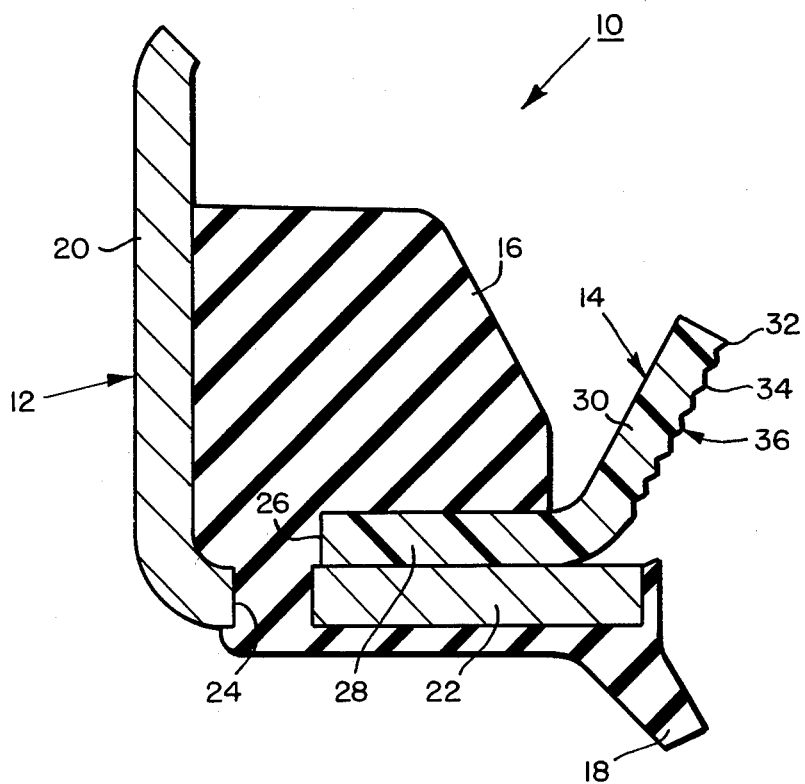

METHOD OF MAKING A SHAFT SEAL WITH DUAL LIP

BACKGROUND OF THE INVENTION

This invention relates to shaft seals, also known as oil seals, designed for sealing against fluid leakage along shafts and more particularly to shaft seals of the type employing a metal case and a polytetrafluorethylene sealing element and requiring an auxiliary sealing lip.

It is an object of the present invention to provide a shaft seal (and a method for making the seal) of the type employing a metal case and a polytetrafluoroethylene sealing element with a molded auxiliary lip for keeping out dust and contaminates. The method is economical in that it provides the auxiliary lip with very little or no additional expense.

SUMMARY OF THE PRESENT INVENTION

A shaft seal of the type having a metal case with a radial flange and a cylindrical portion and a polytetrafluoroethylene sealing element is provided with an auxiliary lip by providing a plurality of circumferentially spaced-apart apertures through a radial flange of the metal case, positioning the sealing element adjacent the inside surface of the radial flange of the metal case (the inside surface being that surface on the same side of the radial flange as is the cylindrical portion) but spaced radially inwardly from the apertures, and molding an annular filler ring of synthetic rubber between the sealing element and the cylindrical portion of the matal case such that it bonds to the metal case and to the sealing element, and flows through the apertures to the outside of the radial flange to form an auxiliary lip that also bonds to the radial flange.

BRIEF DESCRIPTION OF THE DRAWING

The present invention will be more fully understood by reference to the following detailed description thereof, when read in conjunction with the attached drawing, wherein The FIGURE is a cross-sectional view through one half of a shaft seal made according to a preferred embodiment of the present invention.

DETAILED DESCRIPTION OF THE PREFERRED EMBODIMENT

With reference now to the drawing, the FIGURE shows a shaft seal 10, including an annular metal case 12, a polytetrafluoroethylene sealing element 14, a molded-in annular filler ring 16 of synthetic rubber and an auxiliary lip 18 also molded from the synthetic rubber. The metal case 12 includes a cylindrical portion 20, a radial flange 22 and a plurality of circumferentially spaced apart apertures 24 in the radial flange 22. The sealing element 14 has an O.D. 26 positioned radially inwardly from the apertures 24 and includes a radial portion 28 and a frusto conical portion 30 having a sealing lip 32 and a plurality of hydrodynamic pumping elements 34 on a shaft engaging surface 36 thereof. The pumping elements 34 are not essential, but can be molded into the sealing element 14 at the same time that the filler ring 16 is molded in place, if desired.

The shaft seal 10 is made by positioning the metal case 12 in a mold with the sealing element 14 in place against the radial flange 22, and placing a blank prep form of synthetic rubber between the sealing element 14 and the cylindrical portion 20 of the metal case 12. When the mold is closed, the annular filler ring 16 is formed in position as shown and a portion of the synthetic rubber flows through the apertures 24 to the side of the radial flange 22 opposite the sealing element 14 to form the molded auxiliary lip 18. The synthetic rubber chemically bonds to the metal of the case 12 and mechanically bonds to the polytetrafluoroethylene sealing element 14. The manner in which a mechanical bond is formed between a rubber element such as the filler ring 16, and a polytetrafluoroethylene element such as the sealing element 14, and a chemical bond is formed between a rubber element and a metal element, such as the metal case 12, are well-known to those skilled in the art and in and of itself forms no part of the present invention and therefore need not be described in detail herein. It will suffice, therefore, to simply state that the sealing element 14 is etched, by acid for example, to provide a large number of small pits for the rubber of the filler ring 16 to flow into, to provide the mechanical bonding, as is well-known in the art. The metal case 12 is phosphated and cemented (using, for example, a methyl ethyl ketone base adhesive), prior to insertion into the mold, to provide the chemical bond, as is also well-known in the art. The mold usually is closed for about 3-4 minutes, and a temperature of about 360°-400° F. and a pressure of about 16,000-20,000 psi is used.

While th present invention has been described in detail with respect to the preferred embodiments thereof it is noted that various modifications and changes can be made therein as will be evident to one skilled in the art. For example, the outside diameter of the sealing element may extend all the way to the cylindrical portion of the metal case 12, however, in such case the sealing element 14 would be provided with a plurality of circumferentially spaced-apart openings to register with the apertures 24 so that the synthetic rubber can flow through to the opposite side of the radial flange.

I claim:

1. A method for making a shaft seal of the type including a single annular metal case having a radial flange and a cylindrical portion, and an annular polytetrafluoroethylene sealing element including a radial portion and a sealing lip, said method comprising the steps of:
   a. connecting said sealing element to said case by placing said radial portion of said sealing element against the inside surface of said radial flange of said case and molding an annular synthetic rubber filler ring in the annular space between said radial portion of said sealing element and said cylindrical portion of said metal case, said filler ring being a solid body substantially filling said annular space and being spaced away from and out of contact with said sealing lip, and bonding said filler ring to both said radial portion of said sealing element and to said cylindrical portion of said case; and
   b. molding an auxiliary lip from said synthetic rubber simultaneously with said filler ring molding step, said auxiliary lip being located on the opposite side of said radial flange from said sealing lip.

2. The method according to claim 1 wherein said molding steps comprise positioning said metal case and said sealing element in a mold, positioning a synthetic rubber blank prep form in said mold, providing a plurality of spaced-apart apertures in said radial flange of said metal case, and closing said mold to form said filler ring.

3. The method according to claim 2 wherein said rubber blank prep form positioning step comprises positioning said prep form in an annular space between said cylindrical portion of said metal case and said radial portion of said sealing element.

4. The method according to claim 3 including positioning said radial portion of said sealing element in said mold such that it does not block said apertures.

5. The method according to claim 4 including positioning the O.D. of said radial portion of said sealing element radially inwardly from said apertures.

6. The method of claim 4 including coating said metal case, prior to said bonding step, with a suitable chemical bonding agent.

7. The method of claim 4 including etching said sealing element before bonding to improve the bond between said sealing element and said filler ring.

8. The method of claim 6 including coating said metal case, prior to said bonding step, with a suitable chemical bonding agent.

9. The method according to claim 8 including the step of molding hydrodynamic pumping elements on a shaft engaging surface of said sealing element during said molding steps.

* * * * *

UNITED STATES PATENT AND TRADEMARK OFFICE
CERTIFICATE OF CORRECTION

PATENT NO. : 4,038,359
DATED : July 26, 1977
INVENTOR(S) : Darrell D. Pendleton

It is certified that error appears in the above-identified patent and that said Letters Patent are hereby corrected as shown below:

In Claim 8, line 1, delete "6" and insert therefor --7--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks